US008924793B1

(12) United States Patent
Lee

(10) Patent No.: US 8,924,793 B1
(45) Date of Patent: Dec. 30, 2014

(54) METHODS AND DEVICES FOR EFFICIENTLY UPDATING THE PUSH DOWN LIST IN A STORAGE DEVICE

(75) Inventor: Joe C. Lee, Fullerton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 355 days.

(21) Appl. No.: 13/547,943

(22) Filed: Jul. 12, 2012

(51) Int. Cl.
*G06F 11/00* (2006.01)

(52) U.S. Cl.
USPC .............................. 714/42; 714/54; 714/6.13

(58) Field of Classification Search
None
See application file for complete search history.

(56) References Cited

U.S. PATENT DOCUMENTS

| 5,822,142 A | 10/1998 | Hicken |
| 5,917,724 A | 6/1999 | Brousseau et al. |
| 6,279,089 B1 * | 8/2001 | Schibilla et al. ............... 711/162 |
| 6,985,319 B2 | 1/2006 | Yip et al. |
| 7,047,438 B2 | 5/2006 | Smith et al. |
| 7,155,592 B2 | 12/2006 | Andoh et al. |
| 2002/0191319 A1 | 12/2002 | Liew et al. |
| 2008/0239548 A1 | 10/2008 | Paul et al. |

\* cited by examiner

*Primary Examiner* — Scott Baderman
*Assistant Examiner* — Jason Bryan

(57) ABSTRACT

A data storage device comprises storage media and a controller. The storage media may comprise a plurality of media defects, at least some of the media defects being listed in a grown defect list and a primary defect list comprising a plurality of entries sorted in an order according to physical address locations. The controller may be configured to generate a push down list from the primary defect list and the grown defect list by populating the push down list with entries from the primary defect list such that the push down list entries maintain the order; translating each entry in the grown defect list to a physical address location; and inserting each translated physical address location with updated push down count into the push down list.

20 Claims, 4 Drawing Sheets

| ABA | 0 | 1 | 2 | 3 | 4 | 5 | 6 | 7 |
|---|---|---|---|---|---|---|---|---|
| BLOCK (PDC) | Good (0) | Good (0) | Bad (1) | Bad (2) | Good (2) | Bad (3) | Good (3) | Bad (4) |
| LBA | 0 | 1 | | | 2 | | 3 | |

ABA = LBA + PDC

METHODS AND DEVICES FOR EFFICIENTLY UPDATING THE PUSH DOWN LIST IN A STORAGE DEVICE

BACKGROUND

Hard disk drives store large volumes of data on one or more disks mounted on a spindle assembly. Disk drives employ a disk control system for interfacing with a host (e.g., a computer) to control the reading and writing of data on a disk. Each disk includes at least one disk surface that is capable of storing data. On each disk surface, user data is stored in data sectors (i.e., data sites) organized in concentric circular tracks between an outside diameter and an inside diameter of the disk.

As a result of the manufacturing process, defective data sites may exist on the disk surfaces of the disk drive. These defective data sites are conventionally termed "primary" defects. A defect discovery procedure is performed to locate these defects and mark them out as defective locations on the disk surface that are not available for use. A typical defect discovery procedure includes writing a known data pattern to the disk surface and subsequently reading the data pattern from the disk surface. Defective data sites are identified by comparing the data pattern read from the disk surface with the known data pattern written to the disk surface.

Following the defect discovery procedure, defective data sites are written to a primary defect list (PLIST). The primary defect list is used during formatting of the disk surface to generate a primary defect management table. Once identified in the primary defect management table, the defective data site may not be used for storing data and are passed over or "skipped" during disk drive operations. The PLIST, therefore, is used to archive the location addresses of defective data sites discovered after manufacturing but prior to actual use of the drive so that users can retrieve the information at a later time. As an example, the number of data sites residing on the PLIST provides a generalized indication of the state of the media. Entries in the PLIST are stored in a cylinder/head/wedge/position/length format. This allows a single PLIST entry to represent defects of varying lengths (e.g., multi-sector defects).

Defective data sites encountered after formatting the disk surface or during operation of the drive are known as "grown defects". Grown defects often occur in locations adjacent to defective data sites found during defect discovery. Grown defects are also written to a list, known as the grown defect list (GLIST), similar to that utilized for the primary defects. The GLIST is used to archive the location addresses of defective data sites discovered during normal drive operations so that users can retrieve the information at a later time. Therefore, the number of data sites residing on the GLIST may provide a generalized indication of the health of the drive. GLIST entries are represented in a cylinder/head/wedge/position/length format, where each entry describes a defect of exactly one sector. In contrast to the skip type entries of primary defects, grown defect sites are typically not skipped, but are redirected to alternate data site locations on the disk, which contains the reassigned data of the data site experiencing the grown defect.

DETAILED DESCRIPTION

A formatting operation (carried out using the "formatunit" operation, for example) may be carried out during manufacturing to format the user area from the first user data track till the last user data track of the drive, based on both the PLIST and the GLIST. The formatting operation creates a Push Down List (PDLIST), which enables Logical Block Address (LBA) reading and writing while avoiding the drive defective areas. The PDLIST contains a sequential list of all the defective sectors that are coded in an ABA (Absolute Block Address) format. The order of the defects stored in the PDLIST matches the logical order that sectors are accessed and defects are encountered in a logical mode. The PDLIST, therefore, is actually a numbering of the defects as they occur and also an index to the location of the defect. Each entry of the PDLIST contains two fields. The first field is a numbering of the defects as they occur on the disk. The second field is the push down count (PDC).

The PDLIST, therefore, comprises entries configured as LBA or ABA, arranged in ascending order, together with prior cumulative push down counts (PDC). The PDLIST may be arranged in an LBA or ABA ascending order. The layout of the LBAs or ABAs in the PDLIST is determined by media layout. Conventionally, a cluster concept is used, in which a cluster is a collection of data tracks for a range of servo cylinders, with the LBAs arranged in serpentine fashion across disk surfaces.

Figures 1, 2:
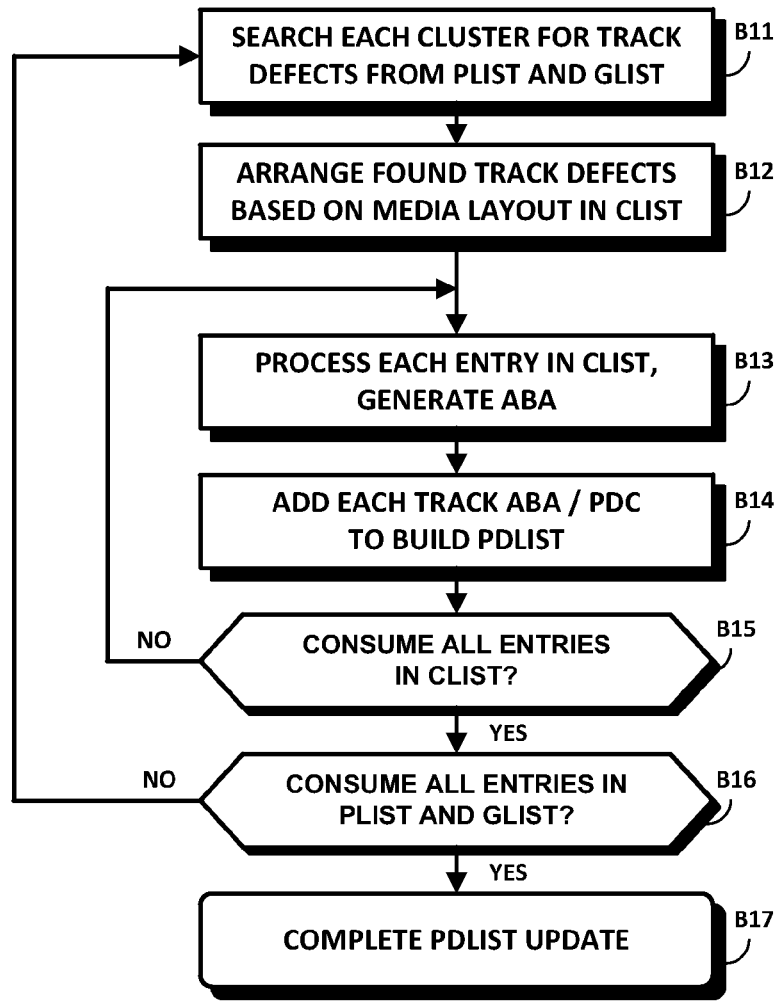
FIG. 1 is a flowchart showing a conventional method for updating a PDLIST.
FIG. 2 shows a table interrelating the ABA, the LBA and the PDC.

FIG. 1 is a flowchart showing a conventional method for updating a PDLIST. As shown therein, Block B11 calls for a search, by cluster for track defects listed in PLIST and GLIST. The found track defects are then arranged based on the serpentine layout of the LBAs across media, in a Combined Defect List (CLIST), as shown at B12. Each entry in the CLIST is then processed, to generate an ABA for that entry, as called for by Block B13. Specifically, ABAs are generated as the sum of the LBA and the Push Down Count (PDC), which is the accumulated defect sector count up to the current LBA.

FIG. 2 shows a table interrelating the ABA, the LBA and the PDC. As shown, the ABAs are listed in ascending order, from zero onwards. The Block row specifies, for each ABA, whether the ABA is good and available for use or bad and thus should not be written to or read from. The PDC in parentheses maintains a running aggregate count of the bad ABAs. Thus, the PDC is zero until the first bad ABA (ABA number 2), is incremented each time a bad ABA is encountered and is maintained constant between bad ABAs. As shown, the ABA is the sum of the LBA and the PDC. The LBA, therefore, enables the disk controller to skip the bad ABAs, and to allow disk access operations only for the good ABAs.

Returning to FIG. 1, each entry in the CLIST is processed and an ABA is generated for each entry, as shown at B13. Block B14 calls for adding each track ABA/PDC to build the PDLIST entries for the current cluster. At Block B15, it is determined whether all entries in the CLIST have been consumed (e.g., processed according to Block B13 and added as a PDLIST entry as shown at B14). If not, the method reverts back to Block B13, as shown by the NO branch of B15. If all entries in the CLIST have, in fact, been consumed (YES branch of Block B15), the conventional method proceeds to Block B16. At Block B16, it is determined whether all entries in both the PLIST and the GLIST have been consumed (e.g., converted to ABA form and added to the PDLIST). If not (NO branch of B16), the method reverts to B11, to process the defects in the next cluster. If all entries in the PLIST and the GLIST have, in fact, been processed (YES branch of B16), the PDLIST update may be considered to be complete.

As may be appreciated, during the manufacturing process, many process steps end up detecting growing defects, for a variety of reasons. Thereafter, one or more of these process steps trigger the generation of both a GLIST and an updated PDLIST before enabling the next process step to be carried out. The PDLIST, therefore, is generated multiple times (often on the order of 30-40 times during the manufacturing and quality assurance processes). Therefore, any decrease in the time necessary to generate and/or update the PDLIST would significantly shorten the time taken by such process steps and correspondingly decrease costs and increase yields. Therefore, embodiments provide devices and processes for efficiently updating the PDLIST. The efficient update process reduces the time needed to update PDLIST, and thus may enable the PDLIST to be updated in the field as well (e.g., as part of a background process) while the drive is in use.

Figure 3A:
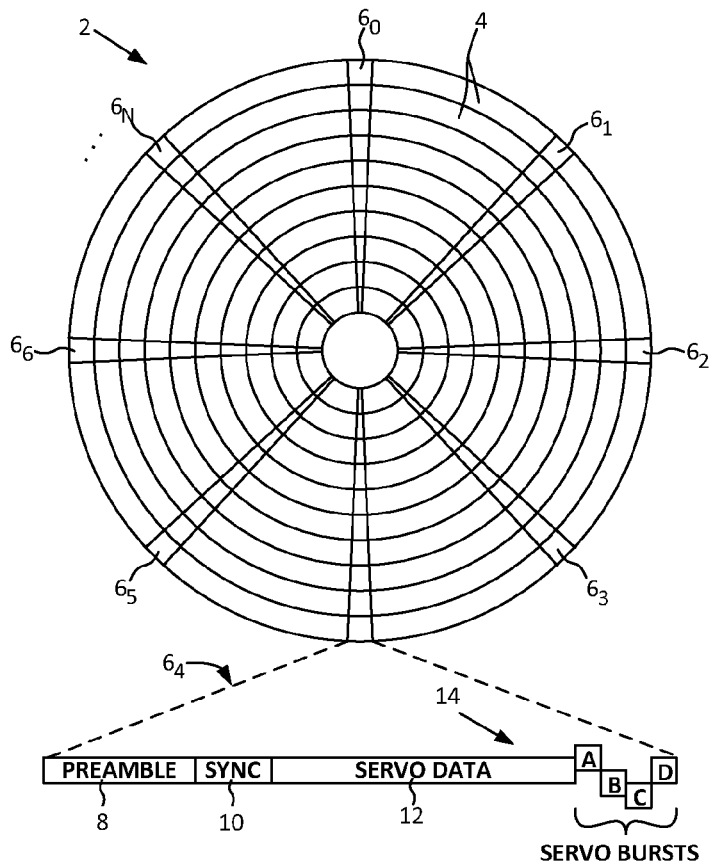
FIG. 3A shows a conventional disk format comprising a plurality of data tracks defined by embedded servo sectors.

FIG. 3A shows a disk 2 having an exemplary prior art disk format comprising a plurality of concentric tracks 4, where each track 4 comprises a plurality of embedded servo sectors 6. A head is actuated radially over the disk 2 in order to write and read user data along circumferential paths defined by the tracks 4. Each embedded servo sector comprises a preamble field 8 for use in synchronizing timing recovery and gain control circuitry, and a sync mark 10 for use in discerning symbol boundaries of servo data 12. At the end of each servo sector 6 are a plurality of servo bursts 14 (A, B, C, D), which are aligned at predetermined offsets from one another and which define a centerline of the track 4. As the head reads the servo bursts 14, an indication of the head's position relative to the track's centerline is derived and used by a servo control system to maintain the head along the desired circumferential path during write and read operations.

Figure 3B:
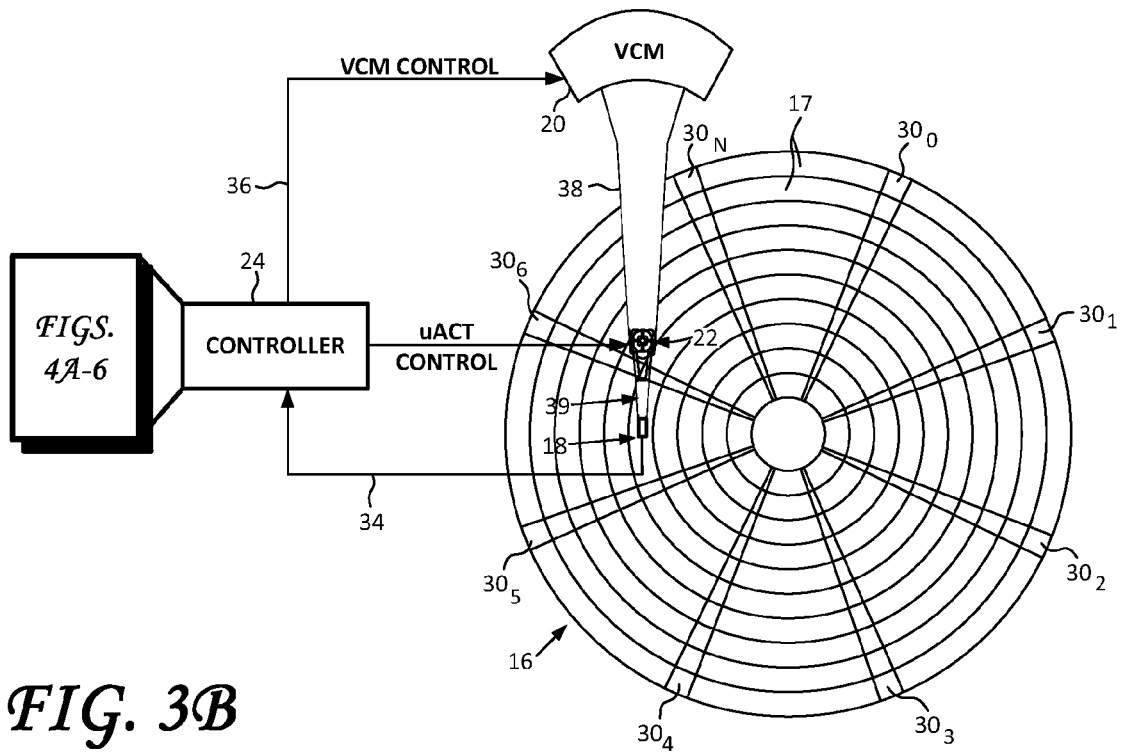
FIG. 3B is a diagram showing major components of a disk drive configured according to one embodiment.

FIG. 3B shows a disk drive configured to generate a push down list from a primary defect list and a grown defect list of a data storage device, according to one embodiment. As shown the disk drive may comprise a disk 16 comprising a plurality of tracks 17, a head 18, a voice coil motor (VCM) 20 and a microactuator 22 for actuating the head 18 over the disk 16. The disk drive further comprises a controller 24 configured to execute the flow diagram of FIG. 6, among its other disk-controlling duties. As shown, the disk 16 comprises a plurality of servo sectors $30_0$-$30_N$ that define the plurality of tracks 17. The controller 24 processes read signal 34 to demodulate the servo sectors $30_0$-$30_N$ into a position error signal (PES). The PES is filtered with a suitable compensation filter to generate a control signal 36 that is applied to a voice coil motor (VCM) 20, which rotates an actuator arm 38 about a pivot in order to position the head 18 radially over the disk 16 in a direction that reduces the PES. The servo sectors $30_0$-$30_N$ may comprise any suitable position information, such as a track address for coarse positioning and servo bursts for fine positioning. The disk 16 may comprise a plurality of track defects, at least some of which may be listed in the aforementioned primary defect list and a grown defect list.

Any suitable microactuator 22 may be employed, such as a piezoelectric (PZT) actuator that transduces electrical energy into a mechanical displacement. In the embodiment of FIG. 3B, the microactuator 22 is integrated with and actuates a suspension 39 that couples the head 18 to the actuator arm 38. However, the microactuator 22 may be integrated at any suitable location, such as with a slider to which the head 18 is mounted. In addition, the microactuator 22 may comprise multiple actuators (e.g., multiple PZTs) that may cooperate to move the head 18 in different radial directions. The controller 24 may be configured to perform the methods and functionality described herein, with particular reference to FIGS. 4A-6.

Figures 4A, 4B:
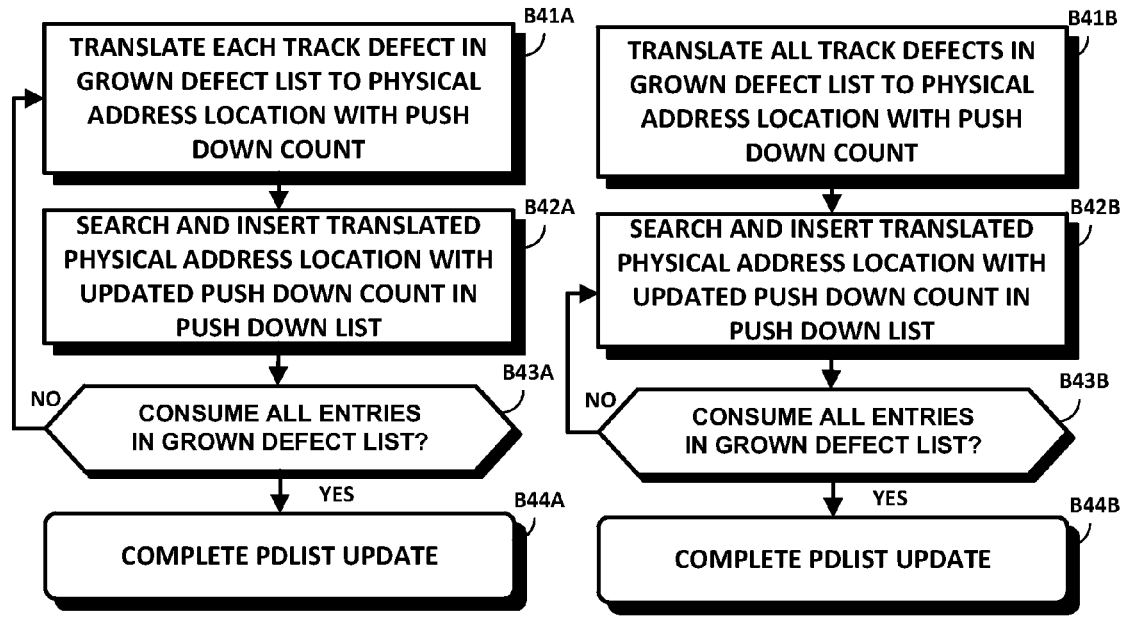
FIG. 4A is a flow diagram for a method for generating a PDLIST from an obsolete PDLIST and a GLIST, according to one embodiment.
FIG. 4B is another flow diagram for a method for generating a PDLIST from an obsolete PDLIST and a GLIST, according to one embodiment.

FIG. 4A is a flow diagram for a method for updating an obsolete PDLIST, according to one embodiment. In FIG. 4A, it is assumed that the PDLIST has been generated by merging a PLIST and a GLIST. In one embodiment, the PDLIST is populated with entries from a PLIST and then GLIST entries are inserted as described below. Rather than carrying out the highly recursive and time and resource-consuming method shown in FIG. 1, one embodiment calls for translating each track defect in the GLIST into a physical location, together with a push down count, as shown at Block B41A. For example, each track defect listed in the GLIST may be translated to ABA form, together with the push down count. As shown at Block B42A, each of the translated entries in the grown defect list (GLIST), together with the updated push down count, are inserted into the PDLIST being updated, after a suitable location therefore has been searched. This search and insert of the physical address locations with updated push down count into the PDLIST updates the PDLIST. At Block B43A, it is determined whether all entries in the GLIST have been consumed—that is, translated and inserted into a selected location in the PDLIST, together with an updated push down count. If not (NO branch of B43A), the method reverts back to Block B41A, to translate each track defect in the GLIST to a physical address location with push down count. When all entries in the GLIST have been consumed (YES branch of B43A), the updating of the PDLIST may be considered to be complete, as shown at Block B44A.

FIG. 4B is another flow diagram for a method for generating a PDLIST from an obsolete PDLIST and a GLIST, according to one embodiment. FIG. 4B differs from FIG. 4A only in that all track defects in the grown defect list are translated as shown at B41B, as opposed to each being translated one at a time, as shown in Block B41A of FIG. 4A. Thereafter, after the search and insert action of Block B42B, the NO branch of Block B43B reverts to Block B42B, and not to Block B41B (as all track defects in grown defect list have already been translated). When all entries in grown defect list have been consumed (YES branch of Block B43B), the PDLIST update is considered to be complete, as shown at Block B44B.

Figure 5:
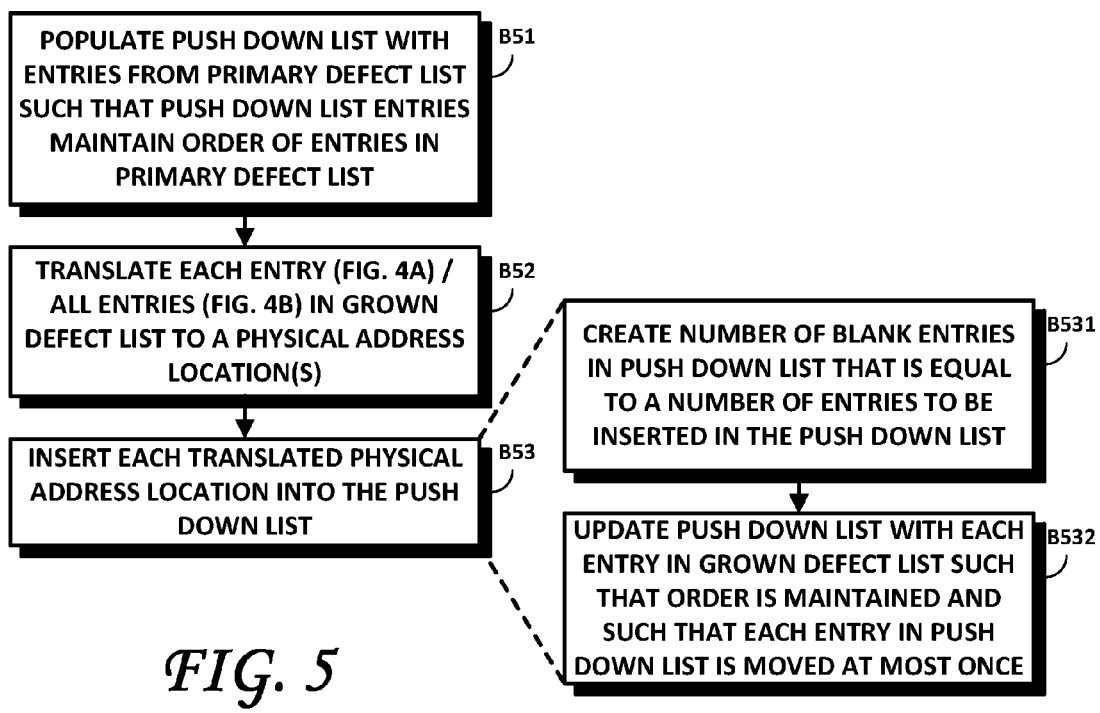
FIG. 5 is a flowchart of a method for generating a PDLIST from a primary defect list from a grown defect list of a storage device, according to one embodiment.

FIG. 5 is a flowchart of a method for generating a PDLIST from a PLIST and a GLIST of a storage device, according to one embodiment. As shown, if the PDLIST does not already exist, a new PDLIST may be populated with entries from the PLIST, such that the PDLIST maintains the order of entries (e.g., ascending by physical address or descending by physical address) in the PLIST, as shown at B51. If the PDLIST already exists, then Block B51 may be skipped. Thereafter, as shown at Block B52, each entry in the GLIST (as shown in FIG. 4A) or all entries in the GLIST (as shown in FIG. 4B)

may be translated to physical address location(s), in a manner that is similar to Block B42A in FIGS. 4A and B42B in FIG. 4B. One implementation of Blocks B42A, B42B and B43A, B43B in FIGS. 4A and 4B is shown in FIG. 5 at Blocks B53, B531 and B532. As shown in Block B531, a number of blank entries may be created in the PDLIST (the PDLIST being updated). According to one embodiment, the number of blank entries that is created in the PDLIST may be equal to the number of entries to be inserted in the PDLIST. Note that the number of entries to be inserted may be just one if the embodiment of FIG. 4A is used, and the number of entries to be inserted may be equal to the number of entries in the GLIST if the embodiment of FIG. 4B is used. Thereafter, as shown at B532, the PDLIST may be updated with each entry in the GLIST such that the order (either ascending or descending) is maintained and such that an entry or entries in the PDLIST that are moved are moved a minimum number of times. For example, according to one embodiment, such a minimum number is one, such that each entry in the PDLIST that is moved, is moved at most one time. The push down count for the moved PDLIST entries may be suitably updated by the push down count associated with the first moved address.

Figure 6:
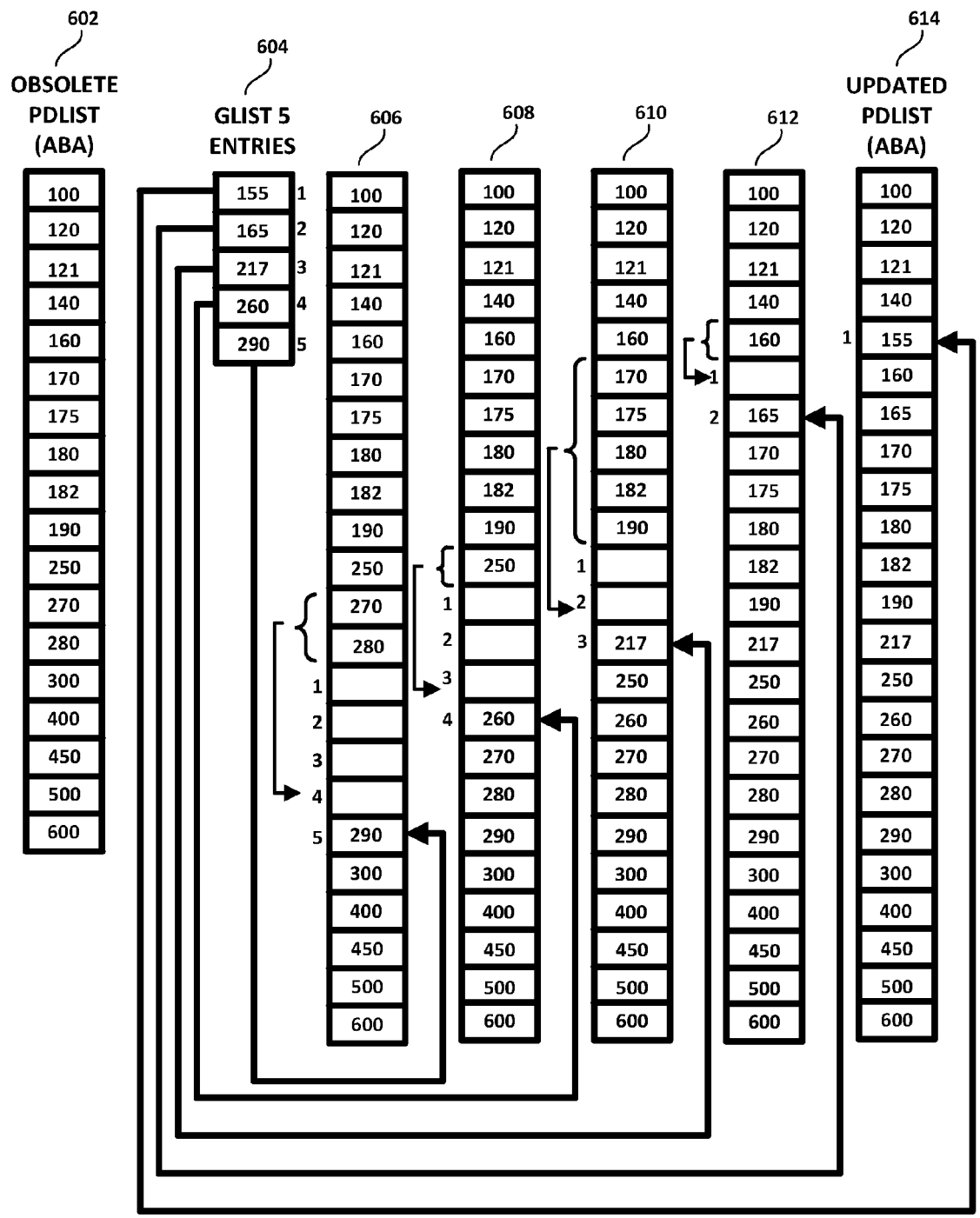
FIG. 6 is a diagram showing a method for generating an updated PDLIST from an obsolete PDLIST and a GLIST, according to one embodiment.

FIG. 6 is a diagram showing one embodiment of a method for generating an updated PDLIST from an obsolete PDLIST and a GLIST, according to one embodiment. Specifically, FIG. 6 shows implementation of Block B42B and B43B in FIG. 4B and Blocks B53 of FIG. 5. As shown, an obsolete PDLIST (a PDLIST that should be updated with GLIST entries) may be provided. If the PDLIST does not yet exist, the PLIST may be used to pre-populate the PDLIST 602. It is to be noted that FIG. 6, for clarity of illustration, does not show the push down count (PDC) field that is present in the PDLIST. As additional process steps, testing or drive operation reveal further media defects, a GLIST 604 may be populated. Note that drives are usually shipped to the customer with an empty GLIST, with all of the entries therein previously having been incorporated into the PDLIST, such as PDLIST 602. It is noted that the GLIST 604 comprises five entries. Therefore, the PDLIST 602 must be efficiently reconfigured to accommodate five additional entries from the GLIST 604. Preferably, to make this updating of the PDLIST 602 as efficient as possible, to make room for the GLIST 604 entries, the existing entries of the PDLIST 602 should be moved a minimum number of times and only those entries that need to be moved should be moved. Moreover, the order of the entries of the PDLIST 602, either ascending by address location or descending by address location, should be respected and maintained, as the PDLIST 602 is updated with the additional entries of the GLIST 604.

According to one embodiment and as shown in FIG. 6, it is assumed that the entries in the GLIST 604 have already been converted to ABA form (if the constituent entries in the PDLIST 602 are ABAs) or converted to LBA form (if the constituent entries in the PDLIST 602 are LBAs). If not readily available or previously converted in ABA or LBA form, the present method may be considered to incorporate such a translation or conversion. Moreover, it is assumed that the GLIST 604 has already been sorted in an ascending or descending order. In the illustrative example of FIG. 6, both the PDLIST 602 and the GLIST 604 are sorted in ascending order. It is understood, however, that the present methods may be readily adapted to the PDLIST 602 and GLIST 604 being in descending order. As shown in FIG. 6, the ascending order of the GLIST 604 reveals address locations entries from "155" (GLIST entry 1) to "165" (GLIST entry 2) to "217" (GLIST entry 3) to "260" (GLIST entry 4) to "290" (GLIST entry 5). If this is not the case, the present method may perform such sorting of address locations, or search for GLIST entries in descending order, from the largest GLIST entry to the smallest GLIST entry.

According to one embodiment, to efficiently update the obsolete PDLIST 602 with the five GLIST address location entries shown at 604, the GLIST entry having the greatest address location may be selected—in this case, GLIST entry 5, having ABA value of "290." Then, a search of the obsolete PDLIST 602 may be carried out for the entry in the PDLIST 602 that has an address location on the PDLIST 602 that is higher than the GLIST entry having the highest address location in the GLIST 604. In the example being developed in FIG. 6, such PDLIST entry is at address location "300," which is the entry in PDLIST 602 that has the lowest address that is greater than the entry in the GLIST 604 having the highest address location; namely, the GLIST entry at address location "290." As shown at 606, the entry in the PDLIST 602 having a lowest address location that is higher than the selected GLIST entry and all subsequent address locations in the PDLIST 602 are moved by a number equal to the number of entries in the GLIST 604, thereby creating five empty slots in PDLIST 606. Accordingly, address locations "300" to "600" are moved by five entries (five being the number of entries in the GLIST 604), and are not thereafter moved again. GLIST entry 5, at address location "290" (the GLIST entry having the highest address location) may then be copied into the empty PDLIST slot immediately adjacent the entry in the PDLIST 604 having an address that is higher than the selected GLIST entry, or PDLIST 604 entry at address "300," as shown by the arrow from GLIST entry 5 to the previously empty slot in the PDLIST 606. This operation leaves four empty slots to fill with the remaining four entries of the GLIST 604.

Upon insertion of the GLIST entry with the address "290," the push down count for the moved PDLIST entries (addresses "300, "400," "450," "500," and "600") are updated by the push down count associated with the address "290." For example, if "290" has a push down count of "10," the push down counts for the moved PDLIST entries are all incremented by 10 accordingly. Alternatively and not shown in FIG. 6, the push down count need not be accumulated by may instead be stored per defect (i.e., not accumulated on a per track basis). In such a case the push down count of addresses "300, "400," "450," "500," and "600" may remain the same after the insertion.

Thereafter, the entry in the GLIST 604 having the next highest address location may be selected; namely the GLIST entry at address location "260," GLIST entry 4. A search of the PDLIST 606 may be carried out for the PDLIST entry that has the lowest address location that is greater than the address location of the selected entry of the GLIST 604. Such PDLIST entry is at address location "270." Therefore, the entry of the PDLIST 606 at address location "270" and any entries having an address location that are greater than address location "270;" namely, address locations "270" and "280," are moved (pushed down in this case) to occupy the PDLIST slots immediately adjacent the last inserted GLIST entry (the GLIST entry at address location "290"). This is shown at 608 in FIG. 6, in which address locations "270" and "280" are pushed down adjacent the just-inserted GLIST entry at address location "290." GLIST entry 4 or the entry at address location "260" may then be copied to the PDLIST 608, in a position immediately adjacent the most recently moved entries; namely, just-moved entries at address locations "270" and "280." This is shown by the arrow between GLIST entry 4 and the previously empty slot of PDLIST 608.

The push down counts of entries with addresses "260" and above will be updated accordingly upon the insertion, as described above.

Then, the GLIST entry with the next highest address location may be selected; namely the entry at address location "217," GLIST entry 3. A search of the PDLIST 608 may be carried out for the entry in the PDLIST 608 having the lowest address location that is higher than the selected GLIST entry. Such entry is at address location "250." Therefore, the entry in the PDLIST 608 at address location "250" and any entries having an address location that is higher than the entry at address location "250" before the empty PDLIST slots (none in this case) are moved (pushed down, in this case) to occupy the PDLIST slots immediately adjacent the last inserted GLIST entry at address location "260." This is shown at 610 in FIG. 6, in which the entry at address location "250" was pushed down adjacent the just-inserted GLIST entry at address location "260." GLIST entry 3 or the GLIST entry at address location "217" may then be copied to the PDLIST 610, in a position immediately adjacent the most recently moved entry or entries; namely, just-moved entry at address location "250." This is shown by the arrow between GLIST entry 3 and the previously empty slot of PDLIST 610. Again, push down counts of entries with addresses "217" and above will be updated accordingly upon the insertion, as described above. The process continues until the last GLIST entry (address location "155") has been inserted into the PDLIST and the corresponding push down counts of the entries affected, including the just inserted entry, have been updated.

Once the insertion process ends, the PDLIST 614 thus constitutes the updated PDLIST, which contains all of the entries of the obsolete PDLIST 602 and all of the entries of the GLIST 604. Moreover, the order (ascending, in this case) of the entries in the obsolete PDLIST 602 was maintained in the updated PDLIST 614 and the entries in the GLIST 604 were inserted therein in a manner that conserved such (ascending, in this case) order. Lastly, each constituent entry of the obsolete PDLIST 602 was moved a minimum number of times—at most once, in this case. Indeed, some entries were not moved at all, such as the entries at addresses "100," "120," "121," and "140." All other entries were moved at most one time. Such limitation on rearranging the entries of the existing PDLIST 602 to generate an updated PDLIST 614 makes the process of updating the PDLIST a highly efficient one, with none of the recursiveness and memory management issues inherent in the conventional methods. The embodiment of FIG. 6, therefore, may be carried out in significantly less time than was otherwise possible using conventional PDLIST rebuilding methods. Moreover, if the PDLIST is maintained in non-volatile memory, one embodiment reduces the over-provisioning and garbage collection issues related to the inefficient and memory intensive conventional method.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures and processes described and shown herein may differ from that shown and described herein. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A data storage device, comprising:
    storage media, the storage media comprising a plurality of media defects, at least some of the media defects being listed in a grown defect list and a primary defect list comprising a plurality of entries sorted in an order according to physical address locations;
    a controller, the controller being configured to generate a push down list from the primary defect list and the grown defect list by at least:
        populating the push down list with entries from the primary defect list such that the push down list entries maintain the order;
        translating each entry in the grown defect list to a physical address location; and
        inserting each translated physical address location with updated push down count into the push down list, the inserting comprising:
            creating a number of blank entries in the push down list that is equal to a number of entries to be inserted in the push down list; and
            updating the push down list with each entry in the grown defect list such that the order is maintained and such that each entry in the push down list is moved at most once.

2. The data storage device of claim 1, wherein the controller is further configured to create the number of blank entries in the push down list by moving an entry on the push down list with a lowest address location on the push down list that has an address location that is lower than an entry on the grown defect list with a highest address location on the grown defect list so as to create the number of blank entries.

3. The data storage device of claim 2, wherein the controller is further configured to move all entries in the push down list that have address locations that are higher than that of the moved entry in the push down list.

4. The data storage device of claim 1, wherein the controller is further configured to repeatedly:
    populate at least one of the blank entries with at least one selected entry of the grown defect list; and
    selectively move push down list entries into remaining ones of the blank entries until no blank entries remain in the push down list and the push down list comprises each of the entries of the grown defect list and the primary defect list.

5. The data storage device of claim 1, wherein the controller is further configured to update the push down list with entries in the grown defect list in order from an entry with the highest address location in the grown defect list to an entry with the lowest address location in the grown defect list.

6. The data storage device of claim 1, wherein the controller is further configured to delete each entry in the grown defect list after the push down list is correspondingly updated.

7. The data storage device of claim 1, wherein the controller is further configured to cause a plurality of Absolute Block Address (ABA) entries to be stored.

8. The data storage device of claim 1, wherein the controller is further configured to store a plurality of Logical Block Address (LBA) entries in the primary defect list.

9. The data storage device of claim 1, wherein the controller is further configured to cause the generated push down list to be stored.

10. The data storage device of claim 1, wherein the order is one of ascending by address locations and descending by address locations.

11. A method of generating a push down list from a primary defect list and a grown defect list of a data storage device, the primary defect list comprising a plurality of entries sorted in an order according to physical address locations, the method comprising:

populating the push down list with entries from the primary defect list such that the push down list entries maintain the order;

translating each entry in the grown defect list to a physical address location; and inserting each translated physical address location with updated push down count into the push down list, the inserting comprising:

creating a number of blank entries in the push down list that is equal to a number of entries to be inserted in the push down list; and updating the push down list with each entry in the grown defect list such that the order is maintained and such that each entry in the push down list is moved at most once.

12. The method of claim 11, wherein creating the number of blank entries in the push down list comprises moving an entry on the push down list with a lowest address location on the push down list that has an address location that is lower than an entry on the grown defect list with a highest address location on the grown defect list so as to create the number of blank entries.

13. The method of claim 12, wherein moving comprises moving all entries in the push down list that have address locations that are higher than that of the moved entry in the push down list.

14. The method of claim 11, wherein updating comprises repeatedly:

populating at least one of the blank entries with at least one selected entry of the grown defect list; and selectively moving push down list entries into remaining ones of the blank entries until no blank entries remain in the push down list and the push down list comprises each of the entries of the grown defect list and the primary defect list.

15. The method of claim 11, wherein updating comprises updating the push down list with entries in the grown defect list in order from an entry with the highest address location in the grown defect list to an entry with the lowest address location in the grown defect list.

16. The method of claim 11, further comprising deleting each entry in the grown defect list after the push down list is correspondingly updated.

17. The method of claim 11, wherein the push down list is configured to store a plurality of Absolute Block Address (ABA) entries.

18. The method of claim 11, wherein the primary defect list is configured to store a plurality of Logical Block Address (LBA) entries.

19. The method of claim 11, further comprising storing the generated push down list.

20. The method of claim 11, wherein the order is one of ascending by address locations and descending by address locations.

* * * * *